June 3, 1969  J. T. SEMEYNS DE VRIES VAN DOESBURGH ET AL  3,448,103
PREPARATION OF α-NITRO-ω-LACTAMS
Filed Feb. 16, 1966
A 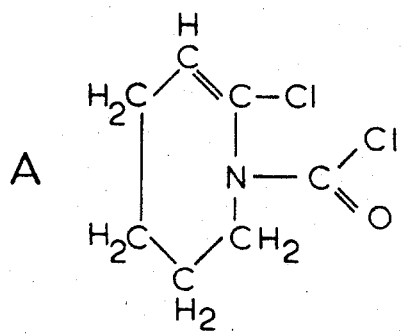
B 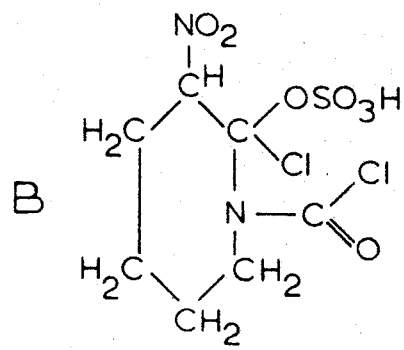
C 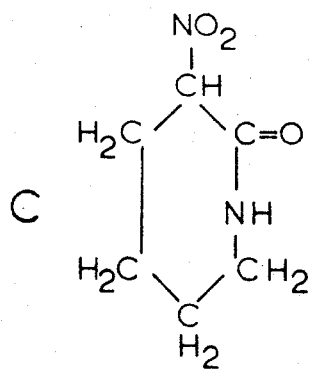

3,448,103
PREPARATION OF α-NITRO-ω-LACTAMS
Johan T. Semeyns de Vries van Doesburgh and Henny Verbrugge, Geleen, Netherlands, assignors to Stamicarbon N.V., Heerlen, Netherlands
Filed Feb. 16, 1966, Ser. No. 527,837
Claims priority, application Netherlands, Feb. 16, 1965, 6501881
Int. Cl. C07d 41/06
U.S. Cl. 260—239                              19 Claims

ABSTRACT OF THE DISCLOSURE

A process is provided for the preparation of α-nitro-ω-lactams comprising treating a 2 - chloro - azacyclo-2,3 - alkene - 1 - carbochloride having 4 to 8 carbon atoms in the alkene group with a nitrating mixture comprising nitric acid and sulphuric acid and/or sulphur trioxide or mixtures thereof or nitryl ions, the proportions being so chosen that substantially no free sulphur trioxide exists in the said mixture when sulphur trioxide is used. The reaction product obtained is a sulphuric ester of 3 - nitro - 2 - chloro - 2 - hydroxy - azacycloalkane - 1 - carbochloride. This intermediate product is reacted with free sulphur trioxide and thereafter hydrolyzed with water to obtain a α-nitro-ω-lactam.

This invention relates to a process for the preparation of α - nitro - ω - lactams. More specifically, this invention relates to a process for the preparation of α-nitro - ω - lactams and to an intermediate compound, which is used in the α - nitro - ω - lactams process, and the process of making the same.

The prior art, for example, British Patent 867,269, teaches that α - nitro - ω - lactams can be prepared by the hydrolysis of 3 - nitro - azacyclo - alkane - 2 - one, 1 - carbochlorides at a temperature of at least 50° C., preferably between 50 and 100° C. The 3 - nitro - azacyclo - alkane - 2 - one, 1 - carbochlorides can be obtained by the hydrolysis, at a temperature below 20° C., of the product obtained by the reaction of a nitrating acid with 2 - chloro - azacyclo - 2,3 alkene, 1 - carbochlorides, as taught by, for example, Netherlands Patent 101,375. In addition, the prior art, for example, Netherlands Patent 103,988 and French Patent 1,315,638, teach that the above-mentioned first stage of hydrolysis can be carried out at a temperature below 20° C. in the presence of a water-immiscible organic solvent for the 3 - nitro-azacyclo - alkane - 2 - one, 1 - carbochlorides, wherein the solvent does not react with the nitrating acid and may be optionally used in the second stage of hydrolysis which is at a temperature above 50° C. If the solvent is used in the second stage of hydrolysis, it will be chosen so that the final product will remain in solution in the second stage of hydrolysis.

The process for the preparation of α - nitro - ω - lactams, starting from 2 - chloro - azacyclo - 2,3 alkene, 1 - carbochlorides and based on the above-mentioned techniques, has drawbacks in that the hydrolysis must be carried out in two stages, the second stage of hydrolysis has to be effected at an elevated temperature, consequently utilizing additional energy and the number of organic solvents which may be utilized is limited due to the fact that several specific requirements must be met.

It is an object of this invention to provide a novel process for the preparation of α - nitro - ω - lactams. It is a further object of this invention to provide a process for the production of α - nitro - ω - lactams from 2 - chloro - azacyclo - 2,3 alkene, 1 - carbochloride wherein hydrolysis is carried out in a single step at a relatively low temperature. It is an additional object of this invention to provide the sulphuric ester of a 3-nitro, 2 - chloro, 2 - hydroxy - azacyclo - alkane - 1 - carbochloride, and a process for preparing the same. It is yet another object of this invention to provide a process for producing α - nitro - ω - lactams from the sulfuric ester of a 3 - nitro, 2 - chloro, 2 - hydroxy - azacyclo-alkane-1 - carbochloride. Still further objectives and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

The above objects may be obtained by the present invention, wherein the sulphuric ester of a 3 - nitro, 2-chloro - 2 - hydroxy - azacycloalkane - 1 - carbochloride, which is obtained by nitrating a 2 - chloroazacyclo - 2,3-alkene - 1 - carbochloride, is reacted with free sulphur trioxide and the resultant reaction product is hydrolyzed to produce α - nitro - ω - lactams.

The sulphuric esters of 3 - nitro, 2 - chloro-2-hydroxy-azacycloalkane - 1 - carbochloride, especially, of 3-nitro, 2-chloro-2-hydroxy-azacycloheptane - 1 - carbochloride, are novel substances which are produced by the reaction of 2 - chloro - azacyclo - 2,3 - alkene - 1 - carbochloride with a nitrating agent similar to a process described in Netherlands Patent 101,375 and Netherlands patent appliction 6408990, both filed in the name of the assignee of the present invention, the disclosures of which are hereby incorporated by reference.

By nitrating agent there is here understood any product useful for introducing one or more nitro groups into organic compounds, e.g., a mixture of nitric acid with sulphuric acid and/or sulphur trioxide, or a product containing nitryl ions, especially, nitryl hydro sulphate.

The intermediate product of this invention is preferably obtained by nitration of 2 - chloro - azacyclo - 2,3-alkene - 1 - carbochloride. Over 95% of this nitration product normally consists of the sulphuric ester of 3-nitro,2 - chloro - 2 - hydroxy - azacyclo - alkane - 1-carbochloride. Although not preferred, this nitration product may contain other constituents, such as sulphuric acid, which may react with the sulphur trioxide. In such cases, uneconomically large amounts of sulphur trioxide must be added. Most preferably, the intermediate product of this invention is obtained by the nitration of 2-chloro - azacyclo - 2,3 - alkene - 1 - carbochloride with a mixture of nitric acid and sulphur trioxide with liquid sulphur dioxide as the solvent.

The reaction of this invention is preferably effected in a solvent, preferably at a temperature below 5° C. The preferred solvent is liquid sulphur dioxide and the most preferred temperature is that of the boiling point of liquid sulphur dioxide. The solvent used in the nitration reaction may be advantageously transferred to reaction of the intermediate compound with free sulphur trioxide.

The sulphuric ester of 3-nitro 2-chloro-2-hydroxy-azacyclo-alkane-1-carbochloride is preferably reacted with about an equimolecular amount of free sulphur trioxide. By "about equimolecular amount" is meant within 8% of the stoichiometric amount of free sulphur trioxide. The hydrolysis of the primary product obtained in the reaction of the sulphuric ester of 3-nitro, 2-chloro-2-hydroxy-azacyclo-alkane-1-carbochloride with free sulphur trioxide can be carried out in one stage using a relatively low temperature. Preferably, the hydralysis temperature is below 10° C. The hydrolysis reaction can be accomplished in a simple way by merely adding a sufficient amount of ice or ice water to the primary reaction product. If the reaction of the sulphuric ester of 3-nitro, 2-chloro-2-hydroxy-azacyclo-alkane-1-carbochloride with free sulphur trioxide is effected in a solvent, at times it is not necessary to remove the solvent before the hydrolysis reaction. In fact, if liquid sulphur dioxide is used as the solvent in the free sulphur trioxide step, it is even preferred to use the sulphur dioxide solvent in the hydrolysis step, as the evaporation of the sulphur dioxide during hydrolysis is an easy method of maintaining the correct reaction temperature.

If desired, the hydrolysis reaction may be accompanied by the simultaneous addition of a solvent for the α-nitro-ω-lactam. Obviously, the process of this invention permits a wider choice of such solvents than was allowed by prior art processes. Nitrobenzene is the preferred solvent for the α-nitro-ω-lactam.

The 2 - chloro-azacyclo-2,3 alkene-1-carbochlorides which are the starting material for the process of this invention have the general formula:

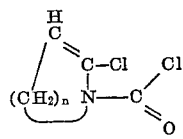

wherein $n$ is an integer from 4 to 10, inclusive, i.e., the $(CH_2)_n$ group is a hydrocarbon radical of 4 to 10 carbon atoms. The intermediate products, i.e., the sulphuric esters of 3-nitro, 2-chloro-2-hydroxy-azacyclo-alkane-1- carbochloride, have the general formula:

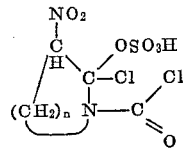

wherein $n$ is defined above. The α-nitro-ω-lactam products have the general formula:

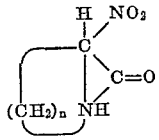

wherein $n$ is defined above.

The process of this invention produces high yields of α-nitro-ω-lactams. For instance, the yield of α-nitro-ω-lactams in the example below was 95.7%. More than 90% of the by-product formed in the present process of producing α-nitro-ω-lactams consists of 3-nitro-azacyclo-alkane-2-one-1-carbochloride, which may be converted into α-nitro-ω-lactams by hydrolysis at elevated temperatures, for example, as taught by British Patent 867,269, filed in the name of the assignee of the present application.

The invention will be more clearly understood from the following example, but it is to be understood to be in no way limited by the scope of the example.

EXAMPLE 50 ml. of sulphur dioxide was condensed in a round-bottomed 250 ml. flask equipped with a stirrer, a reflux cooler and two feeding funnels. 24.3 grams of 2-chloro-azacyclo-2,3-heptene, 1-carbochloride having the formula:

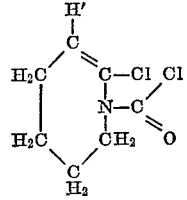

and a mixture of 8.3 grams of nitric acid (99% strength) and 10.9 grams of sulphur trioxide (the mixture was heated at a temperature of 65° C.) were separately added to the flask over a period of about 15 minutes. The nitrating acid was added slightly before the carbochloride. The solution boiled violently throughout the reaction, and the temperature remained constant at about −3° C. due to the solvent boiling effect. The reaction mixture remained clear and colorless. After the feed was stopped, the reaction was allowed to continue for an additional 15 minutes. The efficiency of the formation of the sulphuric ester of 3-nitro, 2-chloro-2-hydroxy-azacyclo-heptane-1-carbochloride, that is, the compound of the formula:

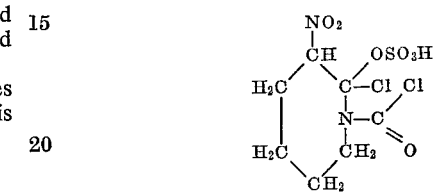

was 99% as determined by nuclear magnetic resonance spectrometry.

10.8 grams of free sulphur trioxide were fed to the above reaction solution through a dropping funnel. The solution became slightly yellow. About 10 minutes after the addition of the free sulphur trioxide, the reaction mixture was poured into 500 ml. of ice water. The solution temperature remained below 4° C. The solid substance which formed was filtered off, washed with 480 grams of water and dried in vacuo at 20° C. 17.8 grams of a product having a melting point of 159–160° C. was obtained. 97% of the dry product was α-nitro-ε-caprolactam, having the formula:

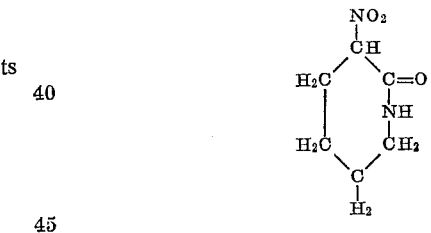

and 2.7% was 3-nitro-azacyclo-heptane-2-one-1-carbochloride. In addition, the 480 grams of wash water contained 3.35% by weight of α-nitro-ε-caprolactam. Calculated on the basis of the 2-chloro-azacyclo-2,3-heptene, 1-carbochloride consumed, the total yield of α-nitro-ε-caprolactam obtained by the cold hydrolysis process of this invention was 95.7%.

It will be understood the practice of this invention is not confined to the specific examples set forth above, but is only limited by the spirit and scope of the following claims.

We claim:
1. A process for the preparation of α-nitro-ω-lactams comprising treating a 2-chloro-azacyclo-2,3-alkene-1-carbochloride having 4 to 10 carbon atoms in the alkene group with a nitrating mixture comprising nitric acid and a member selected from the group consisting of sulphuric acid and sulphur trioxide and mixtures thereof or nitryl hydro sulphate, the proportions being so chosen that substantially no free sulphur trioxide exists in said mixture when sulphur trioxide is used therein, to produce the sulphuric ester of 3-nitro-2-chloro-2-hydroxy-azacyclo-alkane-1-carbochloride as an intermediate product, reacting the same intermediate product with free sulphur trioxide, and thereafter, hydrolyzing the sulphur trioxide reaction product by treating with water to obtain an α-nitro-ω-lactam.

2. The process of claim 1 wherein about equimolecular amounts of sulphur trioxide and the intermediate product are used.

3. The process of claim 1 wherein the reaction of the intermediate product with free sulphur trioxide is at a temperature below 5° C.

4. The process of claim 1 wherein the reaction of the intermediate product with free sulphur trioxide is in a liquid sulphur dioxide solvent.

5. The process of claim 4 wherein the nitration of the 2-chloro-azacyclo-2,3-alkene-1-carbochloride is in a liquid sulphur dioxide solvent and said solvent is transferred to the reaction of the intermediate product with free sulphur trioxide.

6. The process of claim 4 wherein the sulphur dioxide solvent is transferred to the hydrolysis reaction.

7. The process of claim 1 wherein the hydrolysis is at a temperature below 10° C.

8. The process of claim 1 wherein hydrolysis is effected with the simultaneous addition of nitrobenzene as a solvent for the $\alpha$-nitro-$\omega$-lactam.

9. The sulphuric ester of 3-nitro-2-chloro, 2-hydroxy-azacyclo-alkane-1-carbochloride having 4 to 10 carbon atoms in the alkane group.

10. The compound of claim 9 wherein the compound has the structural formula:

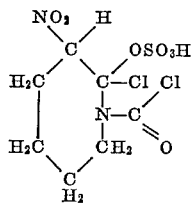

11. A process for the preparation of $\alpha$-nitro-$\omega$-lactams comprising reacting the sulphuric ester of 3-nitro-2-chloro-2-hydroxy-azacyclo-alkane-1-carbochloride having 4 to 10 carbon atoms in the alkane group with about equimolecular amounts of free sulphur trioxide and hydrolyzing by treating with water the resultant product.

12. The process of claim 11 wherein the reaction of the sulphuric ester with free sulphur trioxide is at a temperature below 5° C.

13. The process of claim 11 wherein the reaction of the sulphuric ester with free sulphur trioxide is in liquid sulphur dioxide solvent.

14. The process of claim 13 wherein the liquid sulphur dioxide solvent is transferred to the hydrolysis reaction.

15. The process of claim 11 wherein the hydrolysis is at a temperature below 10° C.

16. The process of claim 11 wherein the hydrolysis is effected with the simultaneous addition of nitrobenzene as a solvent for the $\alpha$-nitro-$\omega$-lactam.

17. The process of claim 11 wherein the sulphuric ester is the sulphuric ester of 3-nitro-2-chloro-2-hydroxy-azacyclo-heptane-1-carbochloride.

18. A process for the preparation of the sulphuric ester of 3-nitro-2-chloro-2-hydroxy-azacyclo-alkane-1-carbochloride having 4 to 10 carbon atoms in the alkane group comprising treating the corresponding 2-chloro-azacyclo-2,3-alkene-1-carbochloride with a nitrating mixture of nitric acid and a member selected from the group consisting of sulphuric acids and sulphur trioxide and mixture thereof or nitryl hydro sulfate, the proportions being so chosen that substantially no free sulphur trioxide exists in said mixture when sulphur trioxide is used therein.

19. The process of claim 18 wherein the carbochloride which is nitrated is 2-chloro-azacyclo-2,3-heptene-1-carbochloride.

References Cited

UNITED STATES PATENTS 3,096,326   7/1963   De Haan et al. _____ 260—239.3

ALEX MAZEL, *Primary Examiner.*

B. I. DENTZ, *Assistant Examiner.*

U.S. Cl. X.R.

260—239.3

PO-1050
(5/69)

UNITED STATES PATENT OFFICE
CERTIFICATE OF CORRECTION

Patent No. 3,448,103          Dated June 3, 1969

Inventor(s) J. T. Semeyns De Vries Van Doesburgh et al

It is certified that error appears in the above-identified patent and that said Letters Patent are hereby corrected as shown below:

Column 3, lines 40-45, the portion of the formula reading:

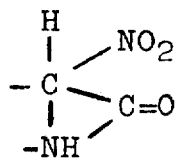   should read   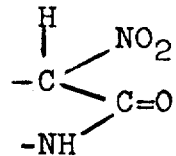

SIGNED AND SEALED

DEC 2 - 1969

(SEAL)
Attest:

Edward M. Fletcher, Jr.
Attesting Officer

WILLIAM E. SCHUYLER, JR.
Commissioner of Patents